(12) United States Patent
Bestler

(10) Patent No.: US 10,834,165 B2
(45) Date of Patent: Nov. 10, 2020

(54) CHUNK RETENTION IN A DISTRIBUTED OBJECT STORAGE SYSTEM USING STREAM SESSIONS AND STREAM SESSION BACKREFERENCES

(71) Applicant: NEXENTA BY DDN, INC., Santa Clara, CA (US)

(72) Inventor: Caitlin Bestler, Sunnyvale, CA (US)

(73) Assignee: Nexenta by DDN, Inc., Santa Clara, CA (US)

( * ) Notice: Subject to any disclaimer, the term of this patent is extended or adjusted under 35 U.S.C. 154(b) by 266 days.

(21) Appl. No.: 15/828,023

(22) Filed: Nov. 30, 2017

(65) Prior Publication Data

US 2019/0166179 A1 May 30, 2019

(51) Int. Cl.
| | |
|---|---|
| *G06F 15/16* | (2006.01) |
| *H04L 29/06* | (2006.01) |
| *H04L 29/08* | (2006.01) |
| *H04N 21/00* | (2011.01) |
| *H04L 12/46* | (2006.01) |
| *H04L 12/54* | (2013.01) |
| *G06F 16/11* | (2019.01) |

(52) U.S. Cl.
CPC .......... *H04L 65/607* (2013.01); *G06F 16/125* (2019.01); *H04L 12/4625* (2013.01); *H04L 12/54* (2013.01); *H04L 65/4069* (2013.01); *H04L 65/608* (2013.01); *H04L 67/146* (2013.01); *H04N 21/00* (2013.01); *H04L 67/1097* (2013.01)

(58) Field of Classification Search
CPC ........................... H04L 65/607; H04L 65/608
See application file for complete search history.

(56) References Cited

U.S. PATENT DOCUMENTS

| | | |
|---|---|---|
| 8,745,095 B2 | 6/2014 | Bestler et al. |
| 8,849,759 B2 | 9/2014 | Bestler et al. |
| 9,547,774 B2 | 1/2017 | Bestler et al. |
| 2013/0185258 A1* | 7/2013 | Bestler ................ G06F 16/1824 707/638 |

* cited by examiner

*Primary Examiner* — Hua Fan
(74) *Attorney, Agent, or Firm* — Okamoto & Benedicto LLP

(57) ABSTRACT

The present disclosure provides an advantageous systems and related methods for scalable object storage. In accordance with an embodiment of the invention, a stream session is opened to initiate a retention epoch during which a series of edits to an object by a source may be performed without seeing edits from other stream sessions. Backreferences identifying the stream session (i.e. stream session backreferences) are applied to retained chunks. While a payload chunk has one or more such associated stream session backreferences, the chunk is retained and not expunged. Advantageously, transitory chunks that are put during the retention epoch may be unput promptly so as to release valuable cache resources. In comparison, the prior approach only eventually releases the data storage resources for expunged version manifests. Other embodiments, aspects and features are also disclosed.

12 Claims, 10 Drawing Sheets

Stream Session Backreference

Stream Session Backreference

Stream Session

Lifecycle of Stream Session Backreference

Method of Chunk Retention 600

Method of Chunk Retention 640

Process to clean up aborted stream session

CHUNK RETENTION IN A DISTRIBUTED OBJECT STORAGE SYSTEM USING STREAM SESSIONS AND STREAM SESSION BACKREFERENCES

BACKGROUND

Technical Field

The present disclosure relates generally to data storage systems. More particularly, the present disclosure relates to data storage systems supporting cloud storage system protocols.

Description of the Background Art

With the increasing amount of data is being created, there is increasing demand for data storage solutions. Storing data using a cloud storage service is a solution that is growing in popularity. A cloud storage service may be publicly-available or private to a particular enterprise or organization. Popular public cloud storage services include Amazon S3™, the Google File System™, and the OpenStack Object Storage (Swift) System™.

Earlier storage systems, such as Network Attached Storage (NAS), for example, typically featured methods which use open, read, write, and close commands for dealing with shared files. These storage systems generally use a central assignment mechanism to assign sectors to files being stored. With centralized assignment of sectors to files, it is easy to keep track of which sectors are in use and which are not in use.

On the other hand, cloud storage systems are typically designed as object storage systems that provide "get" and "put" access to objects, where an object includes a payload of data being stored. The payload of an object may be stored in parts referred to as "chunks". Using chunks enables the parallel transfer of the payload and allows the payload of a single large object to be spread over multiple storage servers. The chunks may be referenced by the metadata for each specific version of an object.

Traditional techniques for maintaining object metadata rely upon a single active metadata server, or tightly-coupled metadata servers that actively collaborate with each other, to control storage allocation for chunks. However, these traditional techniques place a severe constraint on the scalability of the object storage system.

A more recent object storage system, available from Nexenta Systems, Inc. of Santa Clara, Calif., distributes the responsibility for maintaining object metadata over multiple distributed servers. In such an object storage system with distributed object metadata, there is no centralized system for tracking the assignment of chunks to objects. Nevertheless, it remains highly desirable for the system to be capable of determining whether or not a chunk remains part of a retained object version. This is because when a chunk is no longer part of any retained object version, then storing the chunk is no longer necessary, and the resources used to store the chunk may be reclaimed.

SUMMARY

The present disclosure relates to systems and methods for scalable object storage. More particularly, the present disclosure provides systems and methods for chunk retention in an object storage system with distributed object metadata.

The disclosed systems and methods use stream sessions and stream session backreferences. A stream session encompasses edits to a set of one or more objects made by one source during a finite time period referred to as a retention epoch. The target, or targets, of a stream session's edits are enumerated at the start of the stream session. There is a specific object version for each target object which represents the pre-session state.

The edits are saved as version manifests that correspond to object versions. A stream session backreference is a backreference from a chunk to a stream session. A stream session backreference indicates that one or more version manifests created within the stream session require retention of this chunk. This retention requirement is less precise than tracking precisely which chunks are referenced by which object versions, but as will be explained, greatly reduces the editing work required to maintain backreferences within a streaming session.

The present disclosure provides an improved system and methods of tracking the usage of chunks in a distributed object storage system. The solution disclosed herein provides a single method for tracking retention requirements for deduplicated chunks that is effective whether the objects are versioned documents (which are typically edited only a handful of times on any given day while being retained for multiple years) or random access virtual disks or databases (which may turnover their data a large number of times in a single day).

The object storage system and methods disclosed herein advantageously allow rapid reclamation of chunks that are used only briefly for rapidly edited objects (such as virtual RAM disks and databases), without losing the desirable feature of backreferences that support deduplication across versioned objects being updated by multiple users. This is achieved by using stream sessions and stream session backreferences.

In accordance with an embodiment of the invention, a stream session is opened to initiate a retention epoch during which edits to one or more objects by a single source may be performed without seeing edits from other stream sessions. Backreferences identifying the stream session (i.e. stream session backreferences) are applied to retained chunks. While a payload chunk has one or more such stream session backreferences, the chunk is retained and not expunged.

In the presently-disclosed solution, limiting each stream session to a single source enables pruning at the end of the session of no-longer-needed backreferences which were created within, and then discarded within, the same session. In many cases, such no-longer-needed backreferences may have been associated with transitory payload chunks which were newly put during the stream session but not retained at the end of the stream session. The present solution further enables such transitory chunks to be unput promptly so as to release valuable storage resources, especially cache resources.

In comparison, applicant's prior approach, which requires a backreference from each payload chunk to each version manifest referencing the chunk, only eventually releases the data storage resources for expunged version manifests. The prior approach may thus involve substantial delays, after expungement of a version manifest, before reclamation of resources for backreferences that are no longer needed and payload chunks that may be expunged.

Other embodiments, aspects, and features are also disclosed.

DETAILED DESCRIPTION

Figure 1:
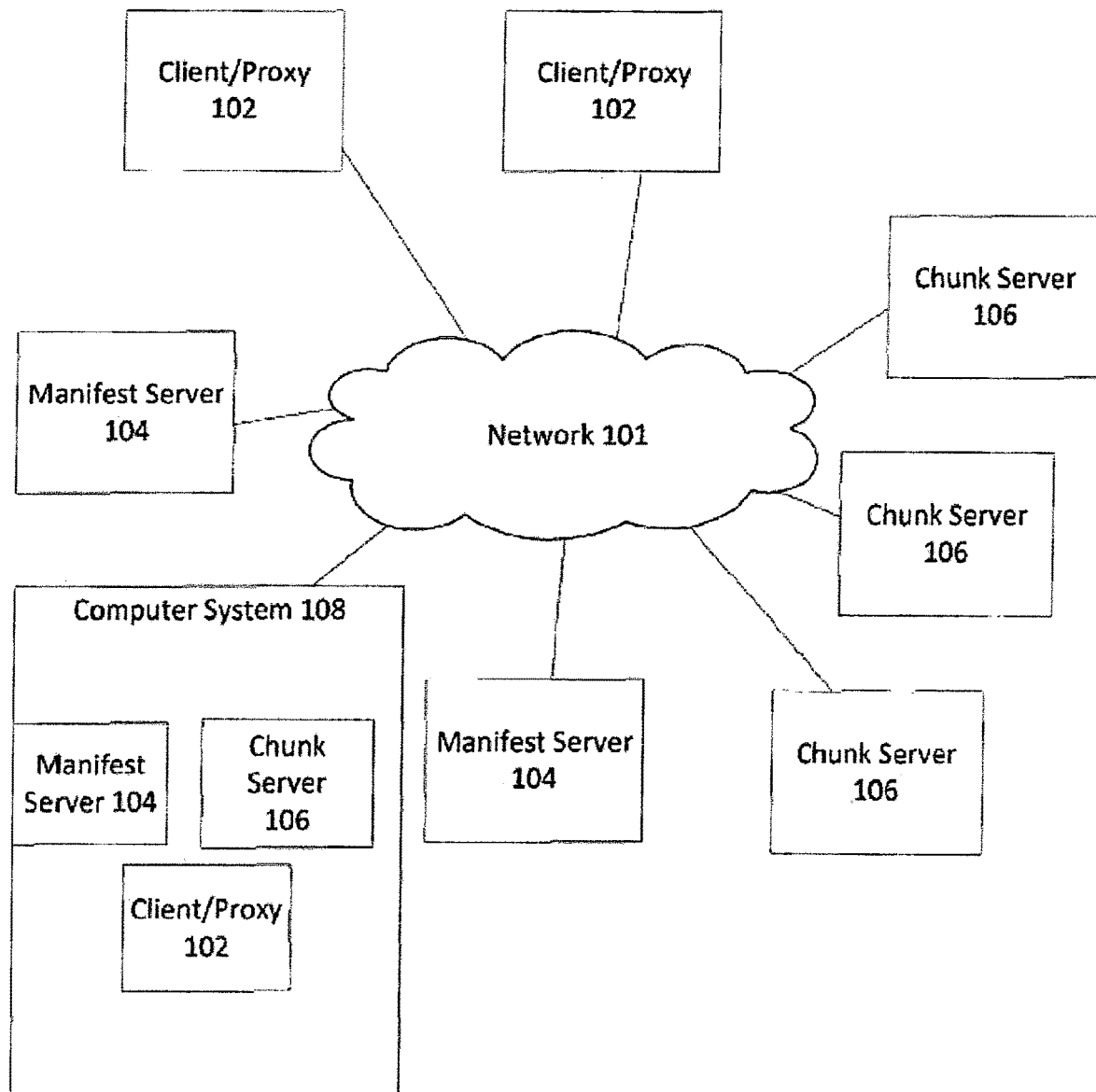
FIG. 1 is a high-level diagram of an object storage system in accordance with an embodiment of the invention.

Object Metadata in a System that Stores Chunks

Object storage systems may store an object payload in potentially sharable chunks. These chunks may be referenced by the metadata for each specific version of an object.

Traditional techniques for maintaining object metadata rely upon a single active metadata server, or tightly-coupled metadata servers that actively collaborate with each other, to control storage allocation for chunks. For example, a parallel Network File System (pNFS) metadata server explicitly controls which storage servers hold each portion of a pNFS file. With the block option under pNFS, the metadata server specifies the block servers and the precise block. With the object server option under pNFS, the metadata server merely specifies the object servers. In another example, the Hadoop Distributed File System (HDFS) metadata server (known as a "namenode") specifies the exact set of chunk servers (known as "datanode") that will hold each block in an HDFS object.

It is useful to compare the metadata burdens of a pNFS metadata server using block servers versus a pNFS metadata server using object storage or an HDFS namenode. With the block server option, the pNFS metadata server is responsible for allocating and tracking every block on every controlled block server. In contrast, with the object server option under pNFS or under HDFS, the metadata server or namenode only tracks the fact that a given chunk/block is stored on a specific server. The datanode or object server allocates its own space, thereby offloading a responsibility from the central metadata server.

Applicants have determined that the traditional technique of requiring all metadata to be handled by a single metadata server (or tightly-coupled metadata servers) places a severe constraint on the scalability of the object storage system. Instead, applicants believe that it is highly desirable for an object storage system to distribute the responsibility for maintaining object metadata over multiple servers. However, as discussed below, it becomes very challenging to orchestrate allocation of chunk storage resources when distributing metadata across multiple servers.

Terminology

The following terminology is utilized in the present disclosure.

A "chunk" refers to a sequence of payload bytes that hold a portion of the payload for one or more objects in an object storage system.

A "chunk identifier" refers to the identifier of a specific chunk. The chunk identifier may be derived using a cryptographic hash fingerprint of the chunk payload of the compressed chunk payload. The cryptographic hash algorithm selected is preferably effectively immune from pre-image attacks. For example, the cryptographic hash may be a SHA-2 hash, such as SHA256 or SHA512.

A "chunk server" refers to a data server that is part of the chunk subsystem which stores and retrieves chunks. The chunk server preferably enforces rules on the naming of chunks so as to enable distributed deduplication. Examples of block-oriented servers that do not meet enforce such rules include a pNFS block server or an HDFS datanode.

A "client" refers to an application or host which may deal directly with manifest servers and chunk servers of the object storage system. The client may also make object get and put requests to a proxy server. The proxy server may be deployed on the same virtualization host as the client (or at least very near it). The interaction with the rest of the system is identical whether the client is an actual client or a proxy acting on its behalf.

A "designated chunk server" refers to a chunk server that is responsible for storing the chunks for a specific chunk identifier according to a consistent hashing algorithm. The local chunk server co-located with or near the client is a primary example of a non-designated chunk server (assuming that it was identified by its network location relative to the client and not by the consistent hashing algorithm).

A "designated manifest server" refers to a manifest server that is responsible for storing the version manifests for a specific object according to a consistent hashing algorithm. The local manifest server co-located with or near the client is a primary example of a non-designated manifest server (assuming that it was identified by its network location relative to the client and not by the consistent hashing algorithm).

A "key-value tuple (KVT) entry" refers to a storage target specific stored blob which holds a variable length value for a specific key. In an exemplary implementation, the key is formed by concatenating a chunk identifier with a type representing a specific facet of the information about the chunk. For example, a chunk has both a payload KVT for payload content and a backreferences KVT for backreference data.

A "manifest server" refers to a metadata server that is part of the manifest subsystem which tracks the chunks that comprise each version of an object. In accordance with an embodiment of the invention, the manifest server does not directly track the locations where those chunks are stored.

A "snapshot" refers to a read-only copy of a specific set of object versions for some defined scope, most typically a directory and all objects that are contained in that directory. In a copy-on-write storage system, such as the presently-disclosed system, the snapshot is not a copy of the metadata, but rather retained metadata that is not deleted even when later versions are created.

A "snapshot manifest" refers to an encoding of the metadata for a specific snapshot. The snapshot manifest effectively enumerates the contents of the snapshot.

A "stream session" refers to a session that encompasses edits to a set of one or more objects made by one source during a finite time period referred to as a retention epoch. The edits are saved as version manifests that correspond to object versions.

A "stream session backreference" refers to a backreference from a chunk to a stream session. A stream session backreference indicates that one or more version manifests created within the stream session require retention of this chunk.

A "version manifest" refers to an encoding of the metadata for a specific version of an object held by the manifest subsystem. The version manifest enumerates the chunk references of the payload chunks for that the object version. In an exemplary implementation of the present solution, the version manifest also encodes key-value pairs for other metadata for the object version. A version manifest for an object is held on at least the designated manifest server for the object.

A Nexenta Cloud Copy-on-Write (CCOW™) object storage system may refer to one or more object storage systems developed by, or to be developed by, Nexenta Systems, Inc. of Santa Clara, Calif.

Object Storage System

FIG. 1 is a high-level diagram of an object storage system 100 in accordance with an embodiment of the invention. As shown, the system 100 may include multiple clients or proxies operating on behalf of clients (client/proxy) 102, multiple manifest servers 104 and multiple chunk servers 106. A network 101 may communicatively interconnect the other components of the system 100.

In one implementation of the system 100, a client/proxy 102 may initiate an object put transaction with a subset of the manifest servers 104. Such a client/proxy 102 may be referred to as the initiator of the object put transaction. Subsequently, the client/proxy 102 may perform zero or more chunk puts with chunk servers 106 before completing the transaction with the manifest servers 104.

The manifest servers 104 collect and serve information about objects as collections of chunks. The metadata stored about an object at a manifest server 104 may include an indication as to whether or not the chunks for the object are encrypted.

The chunk servers 106 store chunks and retrieve chunks. The chunk servers 106 may also validate the chunk identifiers ("fingerprints") of chunks put to them.

Note that each component of the storage system need not be on a separate computer system. For example, a manifest server 104 and a chunk server 106 may be implemented on a same computer system (i.e. the same machine) 108, and that computer system 108 may be connected to the network 101. In another implementation, a client/proxy 102 may also be on the same computer system 108.

In an exemplary implementation, the components of the storage system may be implemented using a modified version of the NexentaEdge™ multi-service scale-out storage software.

Cross-Referencing Between Objects and Chunks

It is a challenging task to distribute object metadata across multiple servers in a way to efficiently use space while supporting various system features. The complexity of the problem is due, in part, because many system features are better supported if the cross-references between object metadata and chunks provide a many-to-many (not just a one-to-many) relationship. In other words, while getting an object that was previously put into the storage system requires one-object-to-many-chunk information, other system features require one-chunk-to-many-objects information. For example, distributed deduplication seeks to identify chunks that will be part of multiple objects. Even if distributed deduplication were not enabled, support of versioning, particularly with append operations, creates chunks that will be part of multiple object versions.

In developing a scalable system for distributing object metadata, applicant has determined that it is undesirable to track cross-references strictly in data controlled by the metadata subsystem. This is because all the metadata servers would have to share detailed location information as to where chunks were being located and would have to synchronize that data on every transaction. This would require tight coupling of metadata servers on a per transaction basis which would work counter to enabling scaling of metadata capacity. Forcing the metadata servers into complex synchronization lockstep procedures would undermine the scale-out benefits which are sought by the payload/metadata separation and the disaggregating of the metadata.

An object storage system developed by the applicant offloads the metadata servers further than pNFS object servers or HDFS. Not only is the metadata subsystem disaggregated so that it can be distributed across many metadata servers, but those collective metadata servers are relieved of the responsibility for tracking which chunk servers store each individual chunk. Instead, the distributed metadata servers only track which chunks are being referenced. These references from the version manifests to the chunks may be referred to as forward-references. Since the forward-references do not specify the locations of the chunks, the chunks are located using a consistent hashing algorithm based upon the chunk identifier, which is calculated from a cryptographic hash of the compressed chunk payload.

Furthermore, in the object storage system developed by the applicant, the forward-references are complemented by backreferences from chunks to the version manifests. Similar to the forward-references not identifying specific chunk servers, the backreferences do not identify specific manifest servers. Rather the backreferences merely identified the version manifests by identifying the object and the specific version. Since the backreferences do not specify the locations of the version manifests referenced, the version manifests are located using a consistent hashing algorithm based upon the fully-qualified object name.

Having both forward and backreferences enables a many-to-many relationship between chunks and version manifests. The same chunk can be part of many objects, even if those objects are not managed by the same manifest servers. If storage servers were specified by manifest server metadata, then it would not be possible to efficiently perform global distributed deduplication. The combination of forward and backreferences also eliminates the need for tight collaboration amongst the metadata servers. Rather, the collective manifest servers manage the version manifests, while the collective chunk servers manage the chunks. These techniques enable greater scalability of object storage systems.

An existing version of the object storage system developed by the applicant is described in U.S. Pat. No. 8,745,095, entitled "Systems and Methods for Scalable Object Storage," which were filed on Sep. 21, 2012 and issued on Jun. 3, 2014. This object storage system has advantageous features that address shortcomings of a previous version of the object storage system, which is described in U.S. Pat. No. 8,849,759, entitled "Unified Local Storage Supporting File and Cloud Object Access," which was filed on Mar. 8, 2012 and issued on Sep. 30, 2014. The disclosures of U.S. Pat. Nos. 8,745,095 and 8,849,759 are hereby incorporated by reference.

One shortcoming addressed by the object storage system of U.S. Pat. No. 8,745,095 related to the previous version of the system only creating backreferences after a committing manifest put operation that referenced the chunk. However, in order to preserve referential integrity, the previous version of the system needed to put chunks before the manifest referencing them was put. This means that every chunk existed for a very short period of time without being referenced by any version of any object. To distinguish between these legitimate newly created chunks and orphaned chunks that were only referenced by versions of objects that had been deleted, a grace period was defined from the time a chunk put was performed until the chunk was expected to be referenced by a version manifest. A chunk unreferenced for twice the length of the grace period is clearly an orphaned chunk and can be deleted. However, with this technique, creation of the backreference was asynchronous from the creation of the chunk. This required revisiting each newly created chunk after the version manifest was committed and, also, when each class-of-storage change was made for each version manifest. This resulted in more network bandwidth being used and less efficient usage of the storage caching.

To overcome this shortcoming, the system disclosed in U.S. Pat. No. 8,745,095 uses speculative backreferences created during a transaction which are tracked separately from verified backreferences. The speculative backreferences are created using a transaction identifier, which is created at the beginning of a transaction to put an object, combined with deferred one-time validation that the referenced object actually references this chunk.

In an implementation of the system disclosed in U.S. Pat. No. 8,745,095, there is, in effect, a long pipeline process driven by creation of a version manifest which will eventually create backreferences from every referenced chunk to the version manifest that references it. This implementation is essentially a continuous MapReduce job; the Map step identifies the forward-references from the newly-created version manifests, and the Reduce step attaches the verified backreference to each chunk replica that is referenced.

MapReduce jobs, however, take substantial time to complete. Performing this process for newly-created version manifests in larger batches makes the processing more efficient. Hence, the verified backreferences are distributed in batches. This batch distribution of backreferences necessitates a delay in the release of the data storage resources for expunged chunks (which are chunks that are no longer referenced by any stored object).

A similar eventual approach applies to the release of the data storage resources for expunged version manifests (which are version manifests that have been superseded by a newer version manifest for the same object). A delete for a verified backreference is eventually distributed per the batch distribution described above. When this results in a chunk that does not have a speculative hold and also has zero verified backreferences, then that chunk's storage resource is eligible to be reclaimed for re-use by the object storage system.

Such an eventual approach works well for versioned objects where new objects created before the above-discussed reclamation of resources represents a very small fraction of the storage cluster's total capacity. For example, consider an example where no more than 0.1% of the cluster's total capacity is used to create new objects on any single day, and that the pipeline process to reclaim un-used resources runs in less than a day. In this example, the waste of resources due to the delay in reclaiming un-used resources is less than 0.1% of the cluster's total capacity.

However, random-access objects being used for a distributed computation present a very different profile. Each write to a database or virtual disk creates a new object version. Further, the data being written may only have an intended lifespan of the duration of a compute job. As a result, new objects created during a single day may require a meaningful portion of a cluster's total capacity. In such cases, waiting a substantial period of time (for example, 24 hours) before eventually reclaiming space from an object version (that was only needed for minutes) may result is a severe amplification of the storage required.

Of particular concern is that recently created, but now moot, chunks are likely to consume DRAM or SSD caching resources which are especially scarce on storage targets (i.e. on storage servers). Using these precious resources to hold chunks which have already been deleted is extremely wasteful. The combination of LRU (least recently used) selection for cache inclusion with lazy eventual expunging will predictably flood the cache with prior versions of heavily written chunks. For example, the logical offset of a virtual disk that holds the root of a file system encoded on the virtual disk will be written frequently, but only the most recent version is worth caching. Wasting limited cache resources on garbage chunks is very inefficient.

The present disclosure provides an improved system and method of tracking the usage of chunks in a distributed object storage system. The solution disclosed herein provides a single method for tracking retention requirements for deduplicated chunks that is effective whether the objects are versioned documents (which are typically edited only a handful of times on any given day while being retained for multiple years) or random access virtual disks or databases (which may turnover their data a large number of times in a single day). In other words, the method disclosed herein is applicable for either type of object.

A significant aspect of the object storage system disclosed herein, and of its prior versions described in U.S. Pat. Nos. 8,745,095 and 8,849,759, is that the object metadata and payload chunks are cross-referenced, but neither the forward-reference from the object metadata to the chunk, nor the backreference from the chunk to the object, includes information as to where the other sub-system has stored the identified resource. The identification is also not dependent on how the other sub-system has encoded the referenced data. In other words, the metadata servers only track the existence of object metadata and payload chunks, without tracking the specific manifest and chunk servers where they are stored.

The object storage system disclosed herein advantageously allows rapid reclamation of chunks that are used only briefly for rapidly edited objects (such as virtual RAM disks and databases), without losing the desirable feature of backreferences that support deduplication across versioned objects being updated by multiple users. This is achieved by still using backreferences, but changing to what the backreferences refer.

Chunk Retention System Using Stream Session Backreferences

Figure 2:
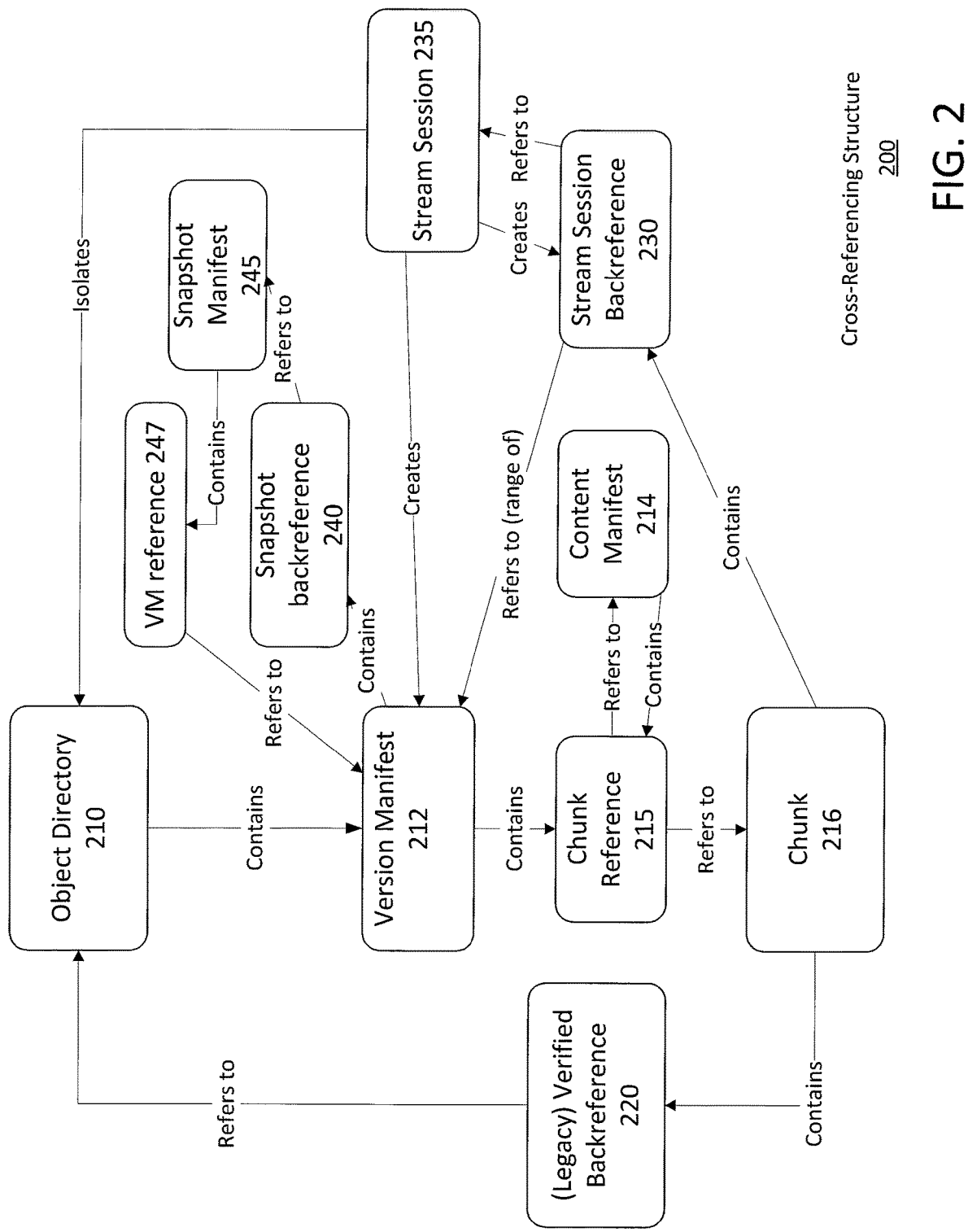
FIG. 2 is a diagram depicting a cross-referencing structure of a chunk retention system using stream sessions and stream session backreferences in accordance with an embodiment of the invention.

FIG. 2 is a diagram depicting a chunk retention system 200 using stream session backreferences in accordance with an embodiment of the invention. An object directory 210 corresponds to a single object and contains one or more version manifests 212 for the object.

Each of the object directories 210 is a container for the metadata for all versions of a single object. A version manifest 212 specifies the metadata for a specific version of an object and refers to payload chunks 216 for the specific version either directly or indirectly. The version manifest 212 refers to the payload chunk 216 directly when it contains a forward reference 215 that refers to the chunk 216. The version manifest 212 may refer to the chunk indirectly through one or more content manifests 214. For example, the version manifest 212 may contain a first forward reference 215 that refers to a content manifest 214, and the content manifest 214 may contain a second forward reference 215 that refers to the chunk 216. As another example, the version manifest 212 may contain a first forward reference 215 that refers to a first content manifest 214, and the first content manifest 214 may contain a second forward reference 215 that refers to a second content manifest 214, and the second content manifest 214 may contain a third forward reference 215 that refers to the chunk 216.

Version manifests 212 are retained according to a version manifest retention policy. In an exemplary implementation, a version manifest is retained if the version manifest 212 is within the last (i.e. most recent) N version manifests for an object, where N is a configurable number, or if the version manifest is included in a snapshot manifest 245. A snapshot backreference 240 contained in the metadata of the version manifest 212 indicates that the version manifest 212 referenced by a version manifest (VM) reference 247 in a snapshot manifest 245.

A payload chunk 216 is retained by the object storage system if the chunk's metadata contains one or more backreferences. In the presently-disclosed system, these backreferences comprise stream session backreferences 230. One or more stream session backreferences 230 may be contained in the metadata of a payload chunk 216.

Note that, for backward compatibility to the prior chunk retention system of U.S. Pat. No. 8,745,095, the metadata of the payload chunk 216 may also include (legacy) verified backreferences 220. A verified backreference 220 refers to a version manifest 212 that references the chunk 216 either directly or indirectly. However, embodiments of the presently-disclosed chunk retention system 200 may operate without such verified backreferences 220.

A stream session backreference 230 refers to a stream session 235 and therefore indirectly refers to a range of version manifests 212 created under the stream session 235 which require chunk retention. The range of version manifests 212 which require chunk retention may be open-ended to implicitly include version manifests yet to be created.

Stream Session Backreferences

Figure 3:
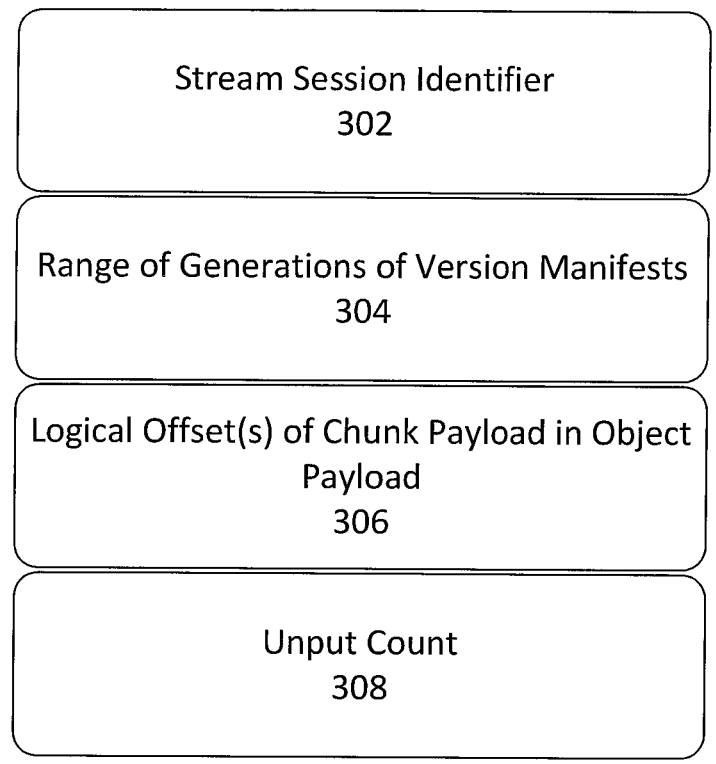
FIG. 3 depicts an exemplary structure of a stream session backreference in accordance with an embodiment of the invention.

As disclosed herein, stream session backreferences 230 have a new format compared to prior backreferences. In an exemplary implementation, as depicted in FIG. 3, a stream session backreference 203 has the following fields.

1) Stream Session Identifier 302: An identifier for the stream session 235 to which this stream session backreference 230 refers. As discussed below, in one implementation, this stream session identifier may be a serial number which is unique for the combination of object and source.

2) Range of Generations of Version Manifests 304: The range of generations of version manifests 212 created under this stream session 235 that require retention of the chunk. This range may be open on the end to implicitly include version manifests yet to be created. For example, the range of generations may be open ended starting at the first generation, which may correspond to the reference version manifest of the stream session 235. In another example, the range of generations may be closed ended starting at the first generation and ending on the fifth generation, which may correspond to the fourth version manifest 212 put during the stream session 235.

3) Logical Offset(s) 306: The logical offset or offsets of the object reference which require(s) this chunk to be retained. Each logical offset indicates a position in an object payload at which the chunk payload is to be inserted. It is necessary to distinguish between multiple possible references to the same chunk from a single stream session. The reasons for multiple references include: the same content in multiple object payloads within the same session; and/or the same content at different logical offsets in a single object payload.

4) Unput count 308: The number of time this same chunk has been unput during this stream session. In other words, the unput count is a sequence number which is the number of prior stream session backreferences that were created during this stream session which would otherwise have been identical. This sequence number is useful to differentiate between chunk references in later versions which have restored references to previously released content. This would typically happen when a subsequent edit of a document reverts to prior content, especially when reverting a portion of the prior content, such as when undoing an edit to a specific paragraph in a word processing document.

Stream Sessions

Figure 4:
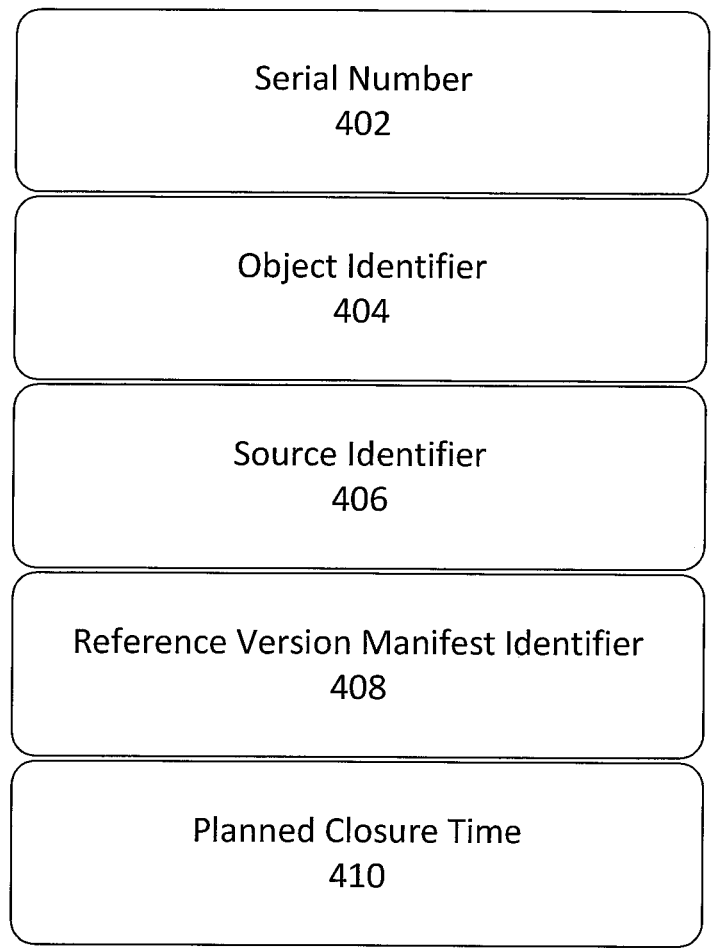
FIG. 4 depicts an exemplary structure of a stream session in accordance with an embodiment of the invention.
Figure 5:
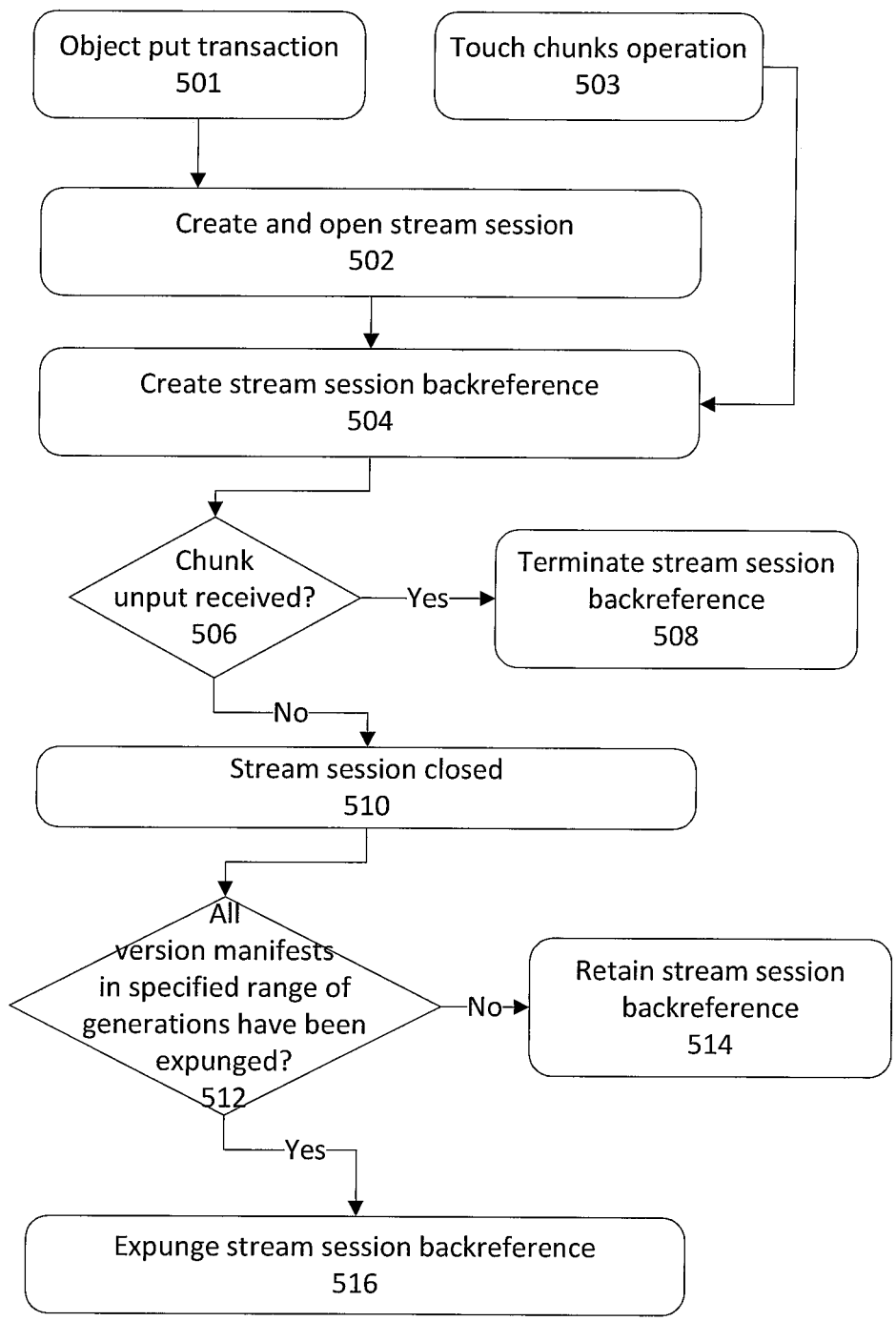
FIG. 5 is a flow chart depicting a lifecycle of a stream session backreference in accordance with an embodiment of the invention.

As disclosed herein, a stream session 235 encompasses a series of edits to one object made by one source. The edits are saved in the object directory 210 for the object as one or more version manifests 212 while the stream session is open (i.e. during a retention epoch). In an exemplary implementation, as depicted in FIG. 4, each stream session 235 may be identified by the combination of the following three attributes.

1) Serial Number 402: This is a serial number that is unique for the combination of object and source. Preferably, the serial number monotonically increases.

2) Object Identifier 404: Identification of a set of one or more objects that is being edited. For example, the set may be identified as a single object, and the identification of the object may be in the form of the name or name hash identifier (NHID) for the object. As another example, the set of objects may be identified as a directory that encloses the objects in the set, and the identification of the directory may be in the form of the name or NHID for the folder. As another example, the set of objects may be identified as the objects referenced by a snapshot manifest.

3) Source Identifier 406: Identification of the specific source for the edits. In one implementation, the identification of the source may be obtained from a unique version identifier (UVID) in the metadata of the version manifest of an edit. The UVID may relate to the specific transaction used to create the object version. An exemplary implementation of the UVID is comprised of a fine-grained timestamp and a source identifier, where the timestamp is fine-grained in that each source is constrained to generate at most one update of a file or object within the same timestamp tick.

In other words, the stream session identifier 302 in FIG. 3 may be formed by combining the above-discussed unique serial number 402, object identifier 404, and source identifier 406. In an exemplary implementation, each stream session also has the following attributes.

4) Reference Identifier 408: When the object identifier identifies a single object, this identifies a reference version manifest for the object. The reference version manifest is an existing version of the object that was put to the storage system prior to this stream session, potentially by another source. When the object identifier identifies a set of objects, then this identifies a reference snapshot manifest, where the reference snapshot manifest identifies a reference version manifest for each object in the set of objects.

5) Planned Closure Time 410: A planned closure time for the stream session. At the planned closure time, other nodes in the system may clean up after this session, unless the session is explicitly closed or extended by that time.

Isolation while Stream Session is Open

In accordance with an embodiment of the invention, each stream session 235, while open, isolates changes to the object or objects being edited. That is, a user editing the object or objects through this open session will not see updates to this object from other sessions.

Note that this isolation does nothing to prevent other editors from updating the object(s) being edited by way of other stream sessions. Preventing others from editing these objects would require some form of cluster-wide lock, which would be difficult to scale.

Rather, the present solution works with a fully-distributed object storage cluster that accepts un-coordinated concurrent updates to the same object and deals with them using a form of eventual consistency. In an exemplary implementation, potentially conflicting edits are identified, and reconciliation of the edits are left to the end user. The use of stream sessions merely extends the duration of editing activity which may result in potentially conflicting edits.

Certain stored objects will be edited very infrequently. Note that for a storage cluster, even a document edited 100 times during a single day is being edited very infrequently. The overwhelming majority of the time the object is not being edited. For these objects, each stream session will be typically very short in duration. Hence, the isolation during the stream session will very rarely result in potentially conflicting edits.

Other stored objects may be edited frequently but not by multiple users concurrently. For example, such objects may correspond to volumes for which concurrent editing is not supported. For such objects, the isolation during the stream session does not pose a problem as it will not result in potentially conflicting edits.

Other stored objects may correspond to files that can be opened for a shared write by multiple users. In an exemplary implementation, access to the file (i.e. the authorization to create version manifests 212 for the object) may be serialized at the source. For example, the serialization of the access may be performed, for example, by NAS (network attached storage) daemons using NAS-specific protocols and/or MVCC (multi-version concurrency control) manifest updating. One mechanism to serialize access to a file (or entire directory) is to use NAS protocol features to force all edits to a single file to go through a single NAS server as the source for a stream session. Note that a globally-enforced exclusive-open of a file (or directory) must be enforced by a single NAS daemon.

Note that the above-described serialization of access by multiple editors to a shared file during a single stream session is a desirable solution, but it is not technically required. Instead, multiple stream sessions may be used, where each stream session is used by a different editor to create a version or versions of the shared file. While it is undesirable for two stream sessions to be working on conflicting versions of an object, the storage system (as discussed above) is designed to detect and resolve such potentially conflicting versions. Fortunately, in practice, conflicting edits are very rare for most objects.

Lifecycle of a Stream Backreference

In accordance with an embodiment of the invention, each stream session backreference 230 may go through the following lifecycle sequence.

1) Creation of the stream session backreference: Typically, a stream session backreference 230 is created for each chunk being put as a by-product of a put transaction 501 that puts a new version of the object to the storage system. The put transaction 501 causes the creation (and opening) 502 of a stream session 235 for updating the object, and the stream session 235 creates 504 a stream session backreferences 230 for the chunk 216 to reference a range of version manifests 212. In an exemplary implementation, the stream session backreference 230 may also be created 504 due to a touch transaction 503, which is described further below.

2) Termination of stream session backreference: If an explicit transaction to unput the chunk is received 506 during the stream session 235 (while the stream session is open), then the stream session backreference 230 is terminated 508 due to the chunk being unput. In an exemplary implementation, the initiator (i.e. the client/proxy 102 initiating the session) is expected to unput chunks 216 which have been put during a stream session 235 when the chunks 216 are no longer referenced by the range of generations of version manifests to be retained after closure of the stream session 235. Note that the range of generations for retention can be null if a chunk is replaced (and so unput) before the first version manifest referencing the chunk has been put.

3) Expungement of stream session backreference: After closure 510 of the stream session 235, the stream session backreference 230 may be expunged 516 once all of the version manifests 212 referenced by it have been expunged 512. The stream session backreference 230 is retained 514 while at least one version manifest referenced by the stream session backreference 230 has not been expunged.

Retention of Chunks, Version Manifests, and Stream Sessions

A payload chunk 216 is retained while it has one or more stream session backreferences 230 (and/or legacy verified backreferences 220, if used). In an exemplary implementation, the stream session backreferences are actually kept in metadata associated with the payload chunk but are not actually included in the cryptographically hashed data of the payload chunk, which is itself immutable and self-validating. (Note that, when objects are created with stream session backreferences 230, there is no longer a need to create a speculative hold on a chunk, so speculative (unverified) backreferences are not needed.) A payload chunk 216 may be expunged if it has no stream session backreferences 230 (and no legacy verified backreferences 220, if used).

A version manifest 212 is retained according to a policy of the storage system or because the version manifest 212 contains a snapshot backreference 240. In an exemplary implementation, the version manifest retention policy may be to retain the last N version manifests contained in the object directory 210 for the object, where N is a configurable number for the storage system. For example, N may be configured to be 3, or 5, or 10, or 15, or 20. A snapshot backreference 240 refers to a snapshot manifest 245 which includes a VM reference 247 to the version manifest 212. Hence, a version manifest 212 may be expunged if it is not amongst the last N version manifests and if it does not contain any snapshot backreferences 240.

Stream Sessions 235 are only expunged after they are ended, and if all Version Manifests 212 created by the stream session have been expunged. Hence, a stream session 235 is retained while it is open or if any version manifest 212 created by the stream session is being retained (has not been expunged).

Touching Retained Chunks

A version of an object (as specified by a version manifest 212 in an object directory 210) is not necessarily composed solely of chunks 216 put during any given stream session 235. Rather, a version of an object may contain chunks 216 inherited from the reference version manifest (which was put during a prior stream session 235, i.e. during a prior "retention epoch", perhaps from a different source).

Hence, when a stream session 235 puts a version manifest 212 in the object directory 210, the stream session 235 must ensure that inherited chunks 216 referenced by the version manifest 212 are not expunged when the reference version manifest in the object directory 210 is expunged. In accordance with an embodiment of the invention, this is accomplished using a "touch retained chunks" operation that adds or modifies stream session backreferences 230 on various chunks.

Touching retained chunks will typically involve a large number of chunks 216. Hence, in accordance with an embodiment of the invention, the "touch retained chunks" operation allows one or more batches of stream session backreferences 230 to be put in a single multicast transaction. (In an exemplary implementation, the operation may be performed in batches small enough so that they can be encoded as unsolicited messages (with a batch number to allow them to be retransmitted if lost) or with a larger batch that may be encoded as a chunk which may be transferred with a rendezvous transfer.)

The initiator may have a touch retained chunks operation performed at one or more of the following times:

a) At the earliest, the touch retained chunks operation may be performed when the retention epoch is initiated. In this case, a batch of stream session backreferences 230 may be put in a multicast transaction to all the chunks of the reference version manifest(s), and the stream session backreferences may be open ended from the first generation (which corresponds to the reference version manifest).

b) The touch retained chunks operation may also be performed at any later time that occurs before the reference version manifest(s) is (are) eligible to be expunged. Advantageously, the later the touch retained chunks operation is performed, the shorter the list of retained chunks will typically be.

In particular, for example, the touch retained chunks operation may be performed when the retention epoch is ended. In this case, the stream session backreferences may specify a closed-ended range with the first and last generation retaining each chunk.

Each recipient storage server applies all the stream session backreferences to every chunk that it has stored locally. While the processing load for applying a batch of stream session back references at the recipients may seem large, it is not excessive because there is a minimal sequence of disk input/output operations performed on each payload chunk that cannot be reduced. The minimal sequence includes creating the payload key-value tuple (KVT) entry itself or with a touch operation.

Furthermore, in an exemplary implementation, a stream session may be extended beyond the planned closure time 410. For example, a stream session may be extended when there have been no requests to modify the pertinent object (s). Such an extension can substantially reduce the required number of backreference operations (i.e. "touch" operations) on each chunk.

Unputs to Release Resources

The initiator retains a list of all chunks it has put during a retention epoch. If this list grows too large to be retained (for example, in cache memory), then the initiator may close the current stream session and create a new stream session (i.e. end the current retention epoch and initiate a new retention epoch). This releases resources used to keep the list of chunks that were put during the stream session.

A substantial portion of chunks put during a retention epoch may be transitory chunks in that they are removed or replaced during the epoch. In accordance with an embodiment of the invention, such transitory chunks may be quickly unput so as to be expunged. This advantageously releases critical cache resources during the epoch.

Stream session backreferences 230 which are put during a stream session include an unput count 308. The unput count 308 guards against a potential race condition where a chunk is unput and then put again in a subsequent edit. Rather than fencing the second put until the prior unput is confirmed to have been applied, we simply include the unput count 308 (which counts the number of times a chunk has been unput during the stream session) to make the two backreferences have distinct identities.

Stream Session Walk-Through

Figure 6A:
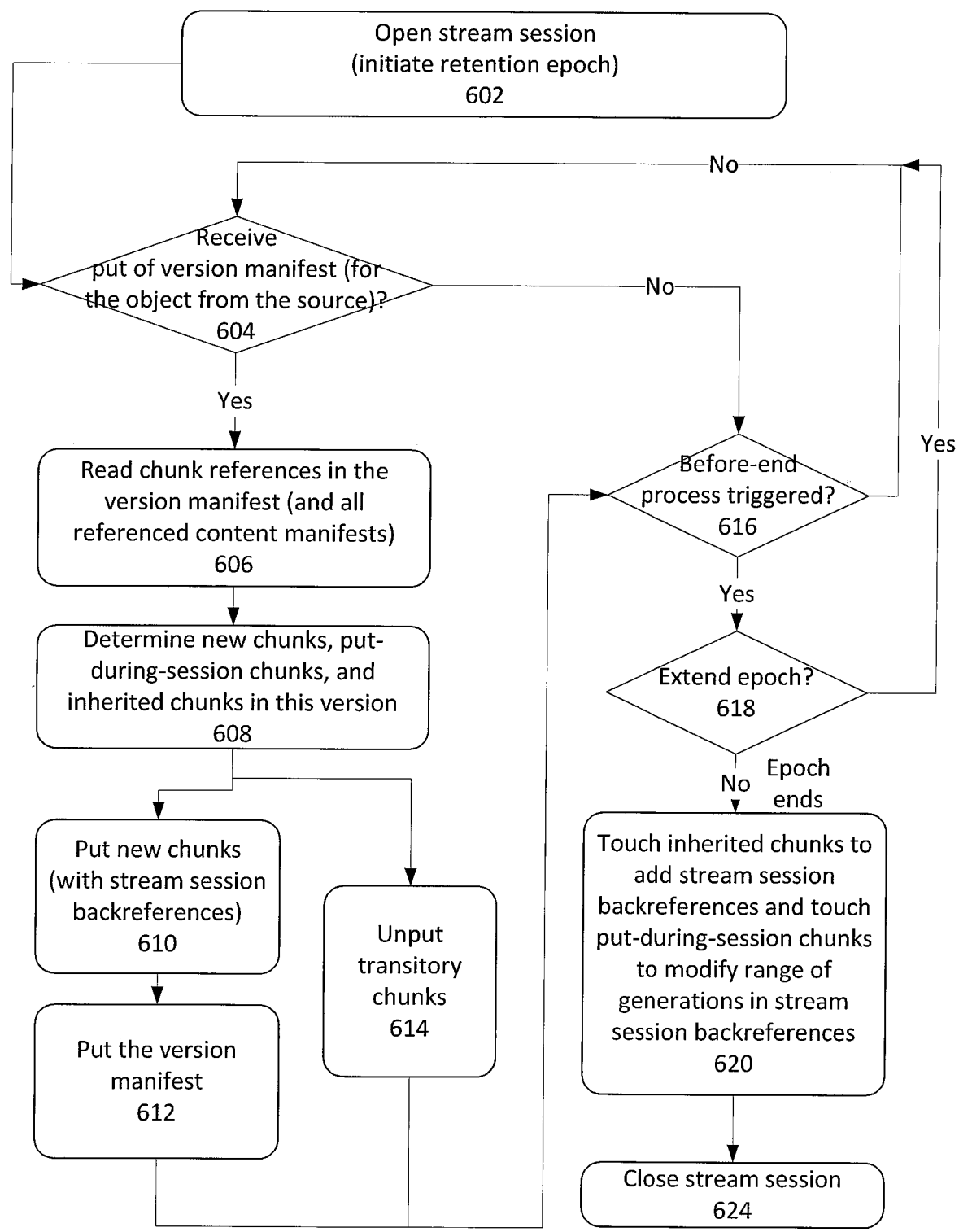
FIG. 6A is a flow chart depicting a first exemplary method of chunk retention using a stream session and stream session backreferences in accordance with an embodiment of the invention.

FIG. 6A is a flow chart of a first exemplary method 600 of chunk retention in a distributed deduplicating storage system 100 using stream session backreferences 230 in accordance with an embodiment of the invention.

Per step 602, the stream session 235 is opened which initiates a retention epoch. As discussed above in relation to FIG. 4, the stream session 235 may be identified by a stream session identifier 302 that comprises a serial number 402, object identifier 404 (which identifies a set of one or more objects) and source identifier 406. The stream session 235 also has a reference identifier 408 which specifies existing version manifests 212 for the object(s). The reference version manifest for an object may typically be the most recent version manifest for the object and may have the same or a different source compared with the source for the stream session.

Per step 604, the procedure continues upon receipt of a request to put a version manifest 212 for one of the identified objects from the source. The version manifest 212 specifies the chunk references (for example, chunk hash identifiers or CHIDs) for a new version of the object. In accordance with an embodiment of the invention, the version manifest 212 to be put may be specified by a modify-in-place edit operation which specifies modifications to the preceding version manifest for the object. For example, a specified modification may specify that the CHID for a new chunk be inserted at the location of the CHID of a chunk that is being replaced. Once the request to put a version manifest 212 is received or created by modify-in-place edits, then, per step 606, chunk references 215 in the version manifest 212 that was put (and in all referenced content manifests 214) are read.

Per step 608, these chunk references 215 are used to categorize or bin the corresponding chunks 216 as new chunks, put-during-session chunks, and inherited chunks. The inherited chunks are chunks from the reference version manifest which is identified 408 by the stream session 235. The put-during-session chunks were put previously during this stream session. The new chunks are new in that they were not put previously during this stream session and they were not inherited from the reference version manifest.

Note that, for modify-in-place manifest edits, new chunks relative to the immediate preceding version may be generally determined from the edit command itself. The remaining chunks which are not being modified may generally keep the same classification (as inherited chunks or put-during-session chunks) as in the immediate preceding version.

Per step 610, the new chunks are put. In accordance with an embodiment of the invention, the new chunks may be specified for logical offsets within a random-access object which may be rapidly edited, such as a database or a virtual disk.

In accordance with an embodiment of the invention, each new chunk that is put includes a stream session backreference 230 in its metadata. As discussed above in relation to FIG. 3, the stream session backreference 230 includes a stream session identifier 302, a range of generations of version manifests 304, a logical offset or offsets of the chunk payload in the object payload 306, and an unput count 308. In this particular case, the range of generations starts at the current generation (corresponding to the version manifest that was put in step 606) and may be open ended.

Note that the system described in U.S. Pat. No. 8,745,095 uses backreferences to explicitly associates each chunk with each version manifest which referenced that chunk. In contrast, the present solution does not need to make that explicit association. The present solution, instead, uses a stream session backreference that can be open ended to include version manifests not yet created within the same session.

Per step 612, the version manifest is put to the object storage system. In an exemplary implementation, the version manifest is put to the namespace manifest of the system. Note that the version manifest is put after its chunks are put.

Per step 614, transitory chunks are unput. In accordance with an embodiment of the invention, these transitory chunks are chunks that were previously put during the present stream session but are not referred to in this version manifest (the version manifest that was put in step 606). Advantageously, valuable cache resources are promptly released at the recipient servers by this unputting of transitory chunks. In comparison, the prior approach only eventually releases the data storage resources for expunged version manifests.

Per step 616, a determination may be made as to whether a before-ending process has been triggered. The before-ending process is a process to be performed before the end of the retention epoch (i.e. closure of the stream session). In an exemplary implementation, there may be several ways of triggering the before-ending process. First, the before-ending process may be triggered when the time approaches within an increment of the planned closure time 410 of the stream session 235. Second, the before-ending process may be triggered when the initiator restarts. Third, the before-ending process may be triggered when the initiator determines that it will not be able to (or that it will be very costly to) retain information about more chunks put during the retention epoch. Fourth, the before-ending process may be triggered by the initiator so that the initiator may view the results of other modifications to the object from other initiators. If the before-ending process is not triggered, then the method 600 may loop back to step 604. Otherwise, if the before-ending process is triggered, then the method 600 may move forward to step 618.

Per step 618, a determination may be made as to whether the retention epoch (i.e. the stream session) is to be extended. For example, a stream session may be extended when there have been no requests to modify the object during the retention epoch. Such an extension can substantially reduce the required number of backreference operations (i.e. "touch" operations) on each chunk. If the retention epoch is extended, then the extended closure time may replace the planned closure time 410 of the stream session 235 and the method 600 may loop back to step 604. Otherwise, if the retention epoch is not extended, then the retention epoch ends, and the method 600 may move forward to step 620.

Per step 620, a touch retained chunks operation is performed. In this case, the touch operation modifies the range of generations in stream session backreferences in various chunks.

For each chunk inherited from the reference version manifest that remains in the version manifest that was put (i.e. for each inherited chunk), this touch operation adds a stream session backreference. The stream session backreference added may specify a closed-ended range that may start at the earliest generation that is being retained (for example, the first generation which corresponds to the reference version manifest) and may end at the last generation (which corresponds to the current version manifest).

For chunks that were put during this session (i.e. put-during-session chunks), this touch operation may modify the stream session backreference so that it specifies a closed-ended range that starts at the earliest generation that is being retained (for example, the first generation which corresponds to the reference version manifest) and ends at the last generation (which corresponds to the current version manifest).

In an exemplary implementation, the touch operations may be performed by assigning a target negotiating group to each chunk based on the chunk reference. The stream session backreferences to additions or modifications may then be sent in a batch or batches. These batches are retained to allow the target machines to request retransmission of a missed batch. Furthermore, the last batch is flagged to require an explicit positive acknowledgement.

Finally, per step 624, the stream session may be closed. Since the stream session is closed, a new stream session editing the object may be opened.

It should be noted that the presently-disclosed chunk retention solution is particularly advantageous when co-deployed in a solution which provides optimization for modify-in-place updates. Such an optimization of modify-in-place updates seeks to optimize editing objects on a finer granularity than is allocated for object payload storage. The usage scenarios which demand improved backreference handling to prevent severe write amplification during rapid random-access editing, also produce severe write amplification when read-modify-write procedures are not optimized.

The presently-disclosed chunk retention solution is not dependent on what solution is used to optimize read-modify-write updates. However, the overall goal of eliminating write amplification is unlikely to be addressed unless some solution is deployed for this second write amplification problem.

Figure 6B:
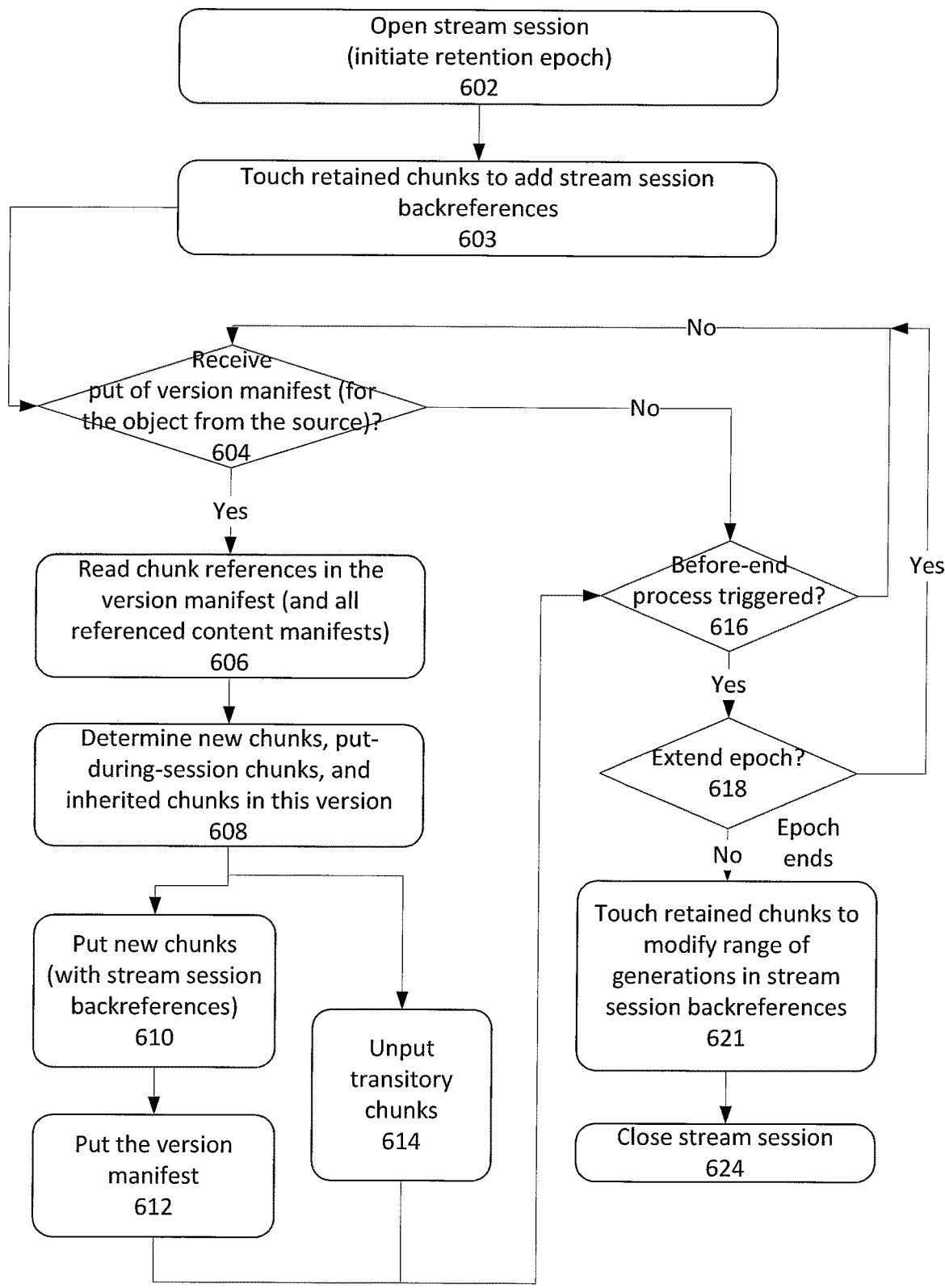
FIG. 6B is a flow chart depicting a second exemplary method of chunk retention using a stream session and stream session backreferences in accordance with an embodiment of the invention.

FIG. 6B is a flow chart of a second exemplary method 630 of chunk retention in a distributed deduplicating storage system 100 using stream session backreferences 230 in accordance with an embodiment of the invention. The second exemplary method 630 has substantially the same steps as the first exemplary method 600. The second exemplary method 630 differs from the first exemplary method 600 primarily in that a touch retained chunks operation is performed 603 when the retention epoch is initiated and is also performed 621 when the retention epoch is ended.

Per step 603 (which is performed between steps 602 and 604), in this implementation, a touch retained chunks operation is performed once the retention epoch is initiated (i.e. once the stream session is opened). Since no version manifest has yet been put during this session, none of the chunks from the reference version manifest have yet been replaced. In other words, the retained chunks at this point include all the chunks referred to, directly or indirectly, by the reference version manifest. This touch operation adds a stream session backreference to each of the retained chunks. The stream session backreferences added may specify an open-ended range that starts at the first generation (which corresponds to the reference version manifest).

Per step 621 (which is performed between steps 618 and 624 instead of step 620), a touch retained chunks operation is also performed after the retention epoch is ended. In this case, the touch operation modifies the range of generations in stream session backreferences in various chunks. For chunks that were put during this session (i.e. put-during-session chunks) and for chunks inherited from the reference version manifest (i.e. inherited chunks), this touch operation may close the range of generations so that it ends at the current version manifest.

In this case, since stream session backreferences were added to all chunks of the reference version manifest in step 603, this touch operation should also nullify the stream session backreferences for the chunks of the reference version manifest that are no longer referenced in the current version manifest. This may be accomplished, for example, by changing the range of generations in these stream session backreferences to null.

Figure 6C:
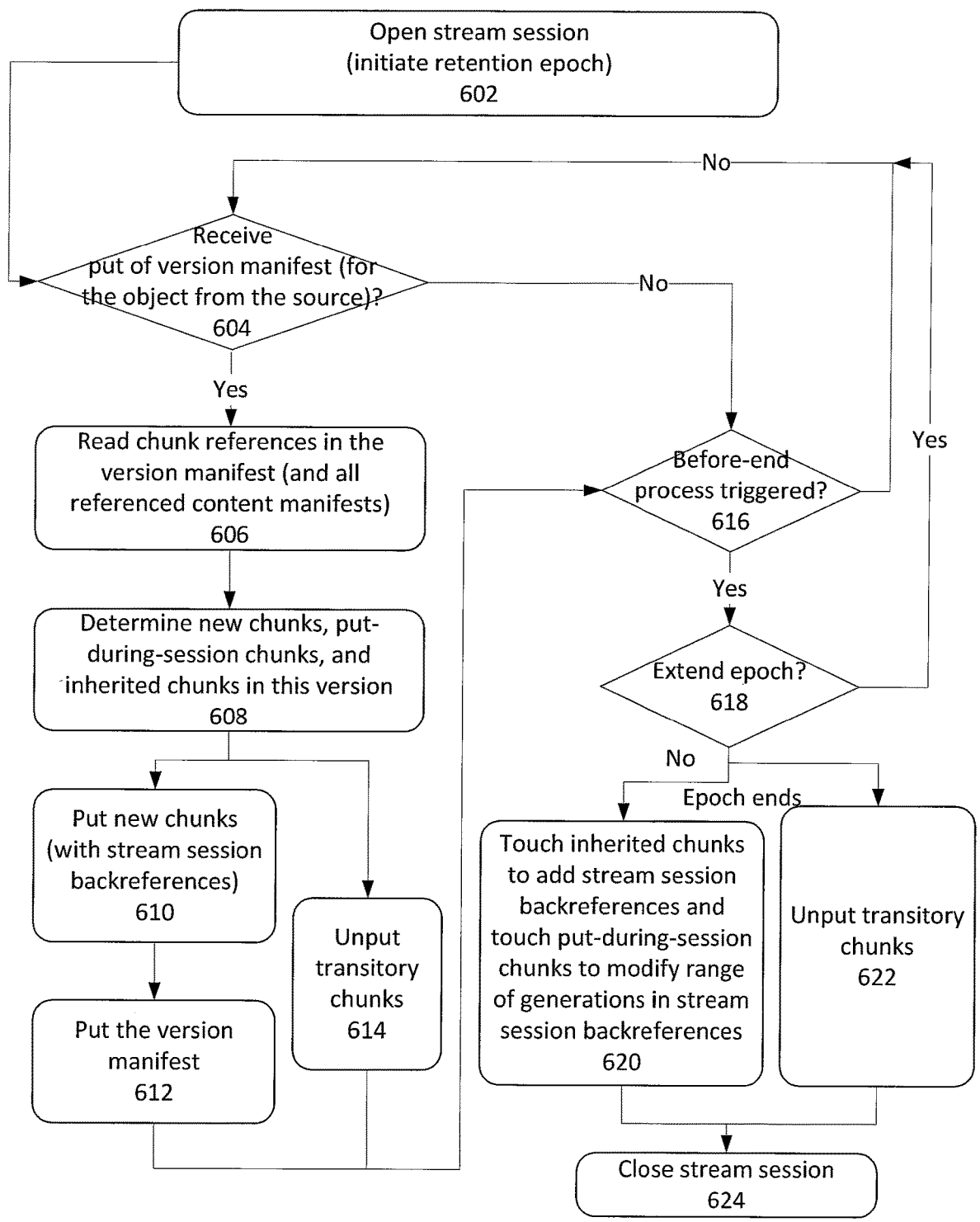
FIG. 6C is a flow chart depicting a third exemplary method of chunk retention using a stream session and stream session backreferences in accordance with an embodiment of the invention.

FIG. 6C is a flow chart of a third exemplary method 640 of chunk retention in a distributed deduplicating storage system 100 using stream session backreferences 230 in accordance with an embodiment of the invention. The third exemplary method 640 has substantially the same steps as the first method 600. The third exemplary method 640 differs from the first exemplary method 600 primarily in that the operation to unput transitory chunks is performed 622 at one time when the retention epoch is ended (after collecting the transitory chunks in a batch). In comparison, the first exemplary method 600 unputs the transitory chunks incrementally during the retention epoch.

Per step 622 (which may be performed between steps 618 and 624 in parallel with step 620), transitory chunks are unput. In accordance with an embodiment of the invention, these transitory chunks are chunks that were previously put during the present stream session but are not referred to in the version manifest that was just put. Advantageously, valuable cache resources are promptly released at the recipient servers by this unputting of transitory chunks. In comparison, the prior approach only eventually released the data storage resources for expunged version manifests.

Note that, to ensure retention of edits across node failures, version manifests may be put periodically. The version manifests that are put periodically be unpublished ephemeral versions if there is no need to retain this specific version other than across system restarts, or they may be published version manifests at any time at the discretion of the initiator.

Aborted Stream Sessions

The presently-disclosed method of chunk retention using stream session backreferences seeks to optimize the expunging of fleeting chunks by requiring the initiator to explicitly unput transitory chunks that it has put. However, one problem is that initiators can fail.

Figure 7:
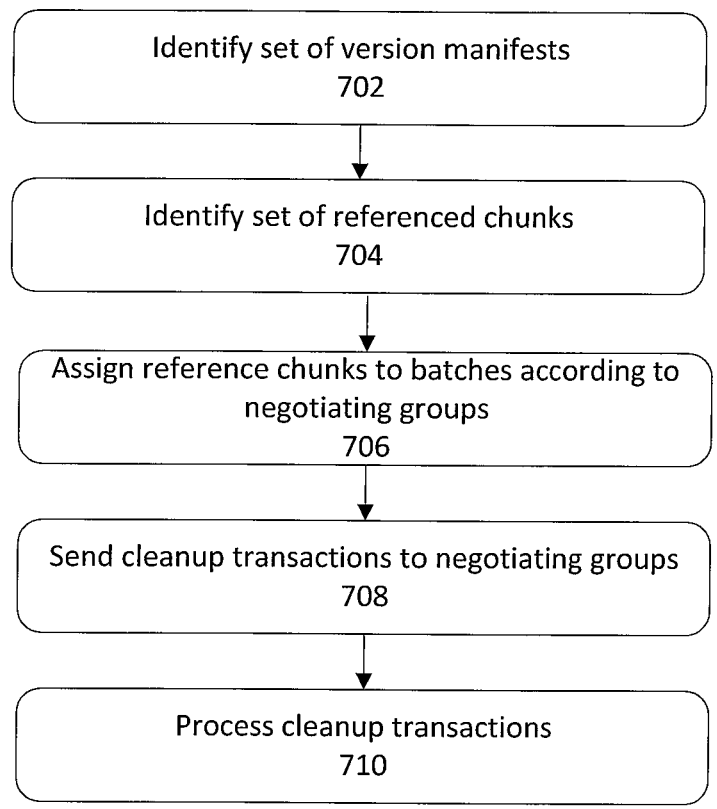
FIG. 7 is a flow chart depicting a clean-up process for an aborted stream session in accordance with an embodiment of the invention.

In accordance with an embodiment of the invention, there is a process to clean up an open stream session if the identified initiator is unresponsive or the stream session closure deadline has passed. In other words, there is a process to clean up an aborted stream session. As shown in FIG. 7, the process is as follows:

In step 702, identification is made as to the set of version manifests reported to the namespace manifest which were part of the aborted stream session.

In step 704, identification is made as to the set of referenced chunks, where the chunks may be referenced directly or indirectly by a version manifest in the set.

In step 706, the referenced chunks are assigned to batches, where each batch is for chunks that are assigned to one negotiating group.

In step 708, a "cleanup session" transaction is sent to each negotiating group with the list (batch) of chunk references for this negotiating group.

In step 710, the cleanup session transaction is processed by the recipient servers. The processing of the cleanup session transaction causes stream session backreferences which specify the aborted stream session to be retained for only the chunks identified in the list of chunk references received. Processing this transaction may require serially processing put chunks in their journal creation order. As such, the cleanup session process is relatively expensive. Hence, it is much preferred that the initiator performs cleanup after itself as discussed above in relation to touching retained chunks and unputting transitory chunks.

Example Computer Apparatus

Figure 8:
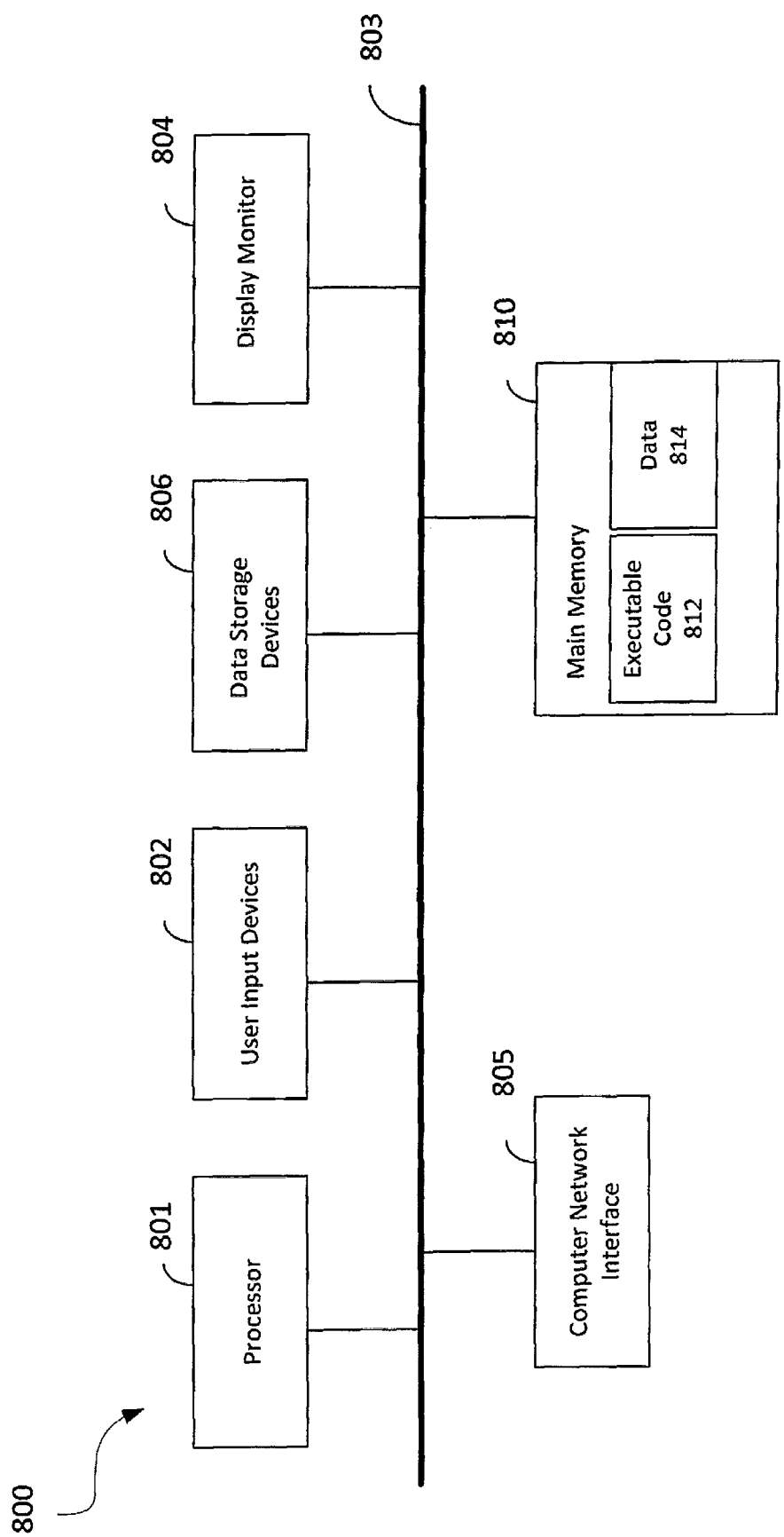
FIG. 8 depicts a simplified example of a computer apparatus which may be configured as a client or a server in the system in accordance with an embodiment of the invention.

FIG. 8 depicts a simplified example of a computer apparatus 800 which may be configured as a client or a server in the system in accordance with an embodiment of the invention. This figure shows just one simplified example of such a computer. Many other types of computers may also be employed, such as multi-processor computers.

As shown, the computer apparatus 800 may include a processor 801, such as those from the Intel Corporation of Santa Clara, Calif., for example. The computer apparatus 800 may have one or more buses 803 communicatively interconnecting its various components. The computer apparatus 800 may include one or more user input devices 802 (e.g., keyboard, mouse, etc.), a display monitor 804 (e.g., liquid crystal display, flat panel monitor, etc.), a computer network interface 805 (e.g., network adapter, modem), and a data storage system that may include one or more data storage devices 806 which may store data on a hard drive, semiconductor-based memory, optical disk, or other tangible non-transitory computer-readable storage media 807, and a main memory 810 which may be implemented using random access memory, for example.

In the example shown in this figure, the main memory 810 includes instruction code 812 and data 814. The instruction code 812 may comprise computer-readable program code (i.e., software) components which may be loaded from the tangible non-transitory computer-readable medium 807 of the data storage device 806 to the main memory 810 for execution by the processor 801. In particular, the instruction code 812 may be programmed to cause the computer apparatus 800 to perform the methods described herein.

EXEMPLARY EMBODIMENTS

Exemplary embodiments of the presently-disclosed invention include, but are not limited to, the following.

Embodiment 1

A distributed object storage system comprising:
a manifest tracking subsystem which encodes forward-references from version manifests to chunks; and
a chunk payload subsystem which stores the chunks and encodes stream session backreferences into metadata associated with the chunks,
wherein the stream session backreferences each identifies a stream session having a finite retention epoch, and
wherein each stream session identifies a set of one or more objects being edited and a source providing edits during the retention epoch.

Embodiment 2

The system of Embodiment 1, wherein each forward-reference references a chunk by an identity of the chunk without identifying any server on which the chunk is stored, and wherein each stream session identifies the set of one or more objects without identifying any server on which the objects are stored.

Embodiment 3

The system of Embodiment 1 further comprising:
the source that requests a put of a version manifest for an object to the system during the retention epoch, wherein chunk references that are contained, directly or indirectly, in the version manifest are read.

Embodiment 4

The system of Embodiment 3, wherein the chunk references are used to determine inherited chunks, and wherein the inherited chunks are chunks from a reference version manifest that is identified by the stream session.

Embodiment 5

The system of Embodiment 4, wherein a touch operation is used to add stream session backreferences to the inherited chunks.

Embodiment 6

The system of Embodiment 4, wherein the chunk references are used to determine put-during-session chunks, and wherein the put-during-session chunks are chunks that were put previously during the retention epoch.

Embodiment 7

The system of Embodiment 6, wherein transitory chunks, which are put-during-session chunks that are not in a most recent version manifest, are unput.

Embodiment 8

The system of Embodiment 7, wherein cache resources are released when the transitory chunks are unput.

Embodiment 9

The system of Embodiment 6, wherein the chunk references are used to determine new chunks, and wherein the new chunks were not put previously during the retention epoch and are not inherited chunks.

Embodiment 10

The system of Embodiment 9, wherein the new chunks are put to the system, each new chunk being put with a stream session backreference.

Embodiment 11

A method for storing chunks of data objects in a distributed object storage system, the method comprising:
encoding forward-references from version manifests to the chunks in a manifest tracking subsystem which stores the version manifests; and
encoding stream sessions backreferences into metadata associated with the chunks,
wherein the stream session backreferences each identifies a stream session having a finite retention epoch, and
wherein each stream session identifies a set of one or more objects being edited and a source providing edits during the retention epoch.

Embodiment 12

The method of Embodiment 11, wherein each forward-reference references a chunk by an identity of the chunk without identifying any server on which the chunk is stored, and wherein each stream session identifies the set of one or more objects without identifying any server on which the object is stored.

Embodiment 13

The method of Embodiment 11 further comprising:
requesting by the source a put of a version manifest to the system during the retention epoch; and
reading chunk references that are contained, directly or indirectly, in the version manifest.

Embodiment 14

The method of Embodiment 13 further comprising:
using the chunk references to determine inherited chunks, wherein the inherited chunks are chunks from a reference version manifest that is identified by the stream session.

Embodiment 15

The method of Embodiment 14 further comprising:
performing a touch operation to add stream session backreferences to the inherited chunks.

Embodiment 16

The method of Embodiment 14 further comprising:
using the chunk references to determine put-during-session chunks,
wherein the put-during-session chunks are chunks that were put previously during the retention epoch.

Embodiment 17

The method of Embodiment 16 further comprising:
unputting transitory chunks, which are put-during-session chunks that are not in a most recent version manifest.

Embodiment 18

The method of Embodiment 17 further comprising:
releasing cache resources when the transitory chunks are unput.

Embodiment 19

The method of Embodiment 16 further comprising:
using the chunk references to determine new chunks,
wherein the new chunks were not put previously during the retention epoch and are not inherited chunks.

Embodiment 20

The method of Embodiment 19 further comprising:
putting the new chunks to the system, each new chunk being put with a stream session backreference.

Embodiment 21

A method of editing an object stored in a distributed object storage system, the method comprising:
receiving a request to put a version manifest for a version of the object from a source to the distributed object storage system;
opening a stream session associated with the object and the source;
reading chunk references in the version manifest;
determining new chunks from the chunk references, wherein the new chunks are not presently stored in the distributed object storage system; and
putting the new chunks with stream session backreferences, wherein each stream session backreference identifies the stream session.

Embodiment 22

The method of Embodiment 21, wherein the stream session is identified using a stream session identifier which comprises a serial number, an object identifier, and a source identifier.

Embodiment 23

The method of Embodiment 21, wherein each stream session backreference further identifies a range of generations of version manifests.

Embodiment 24

The method of Embodiment 23, wherein each stream session backreference provides multiple logical offsets of a chunk payload to differentiate between different occurrences of the chunk payload in one or more object payloads.

Embodiment 25

The method of Embodiment 24, wherein each stream session backreference further provides an unput count comprising a number of prior stream session backreferences that were created during the stream session which would otherwise have been identical.

Embodiment 26

The method of Embodiment 21 further comprising:
determining inherited chunks from the chunk references; and
performing a touch transaction which adds stream session backreferences to the inherited chunks.

CONCLUSION

In the above description, numerous specific details are given to provide a thorough understanding of embodiments of the invention. However, the above description of illustrated embodiments of the invention is not intended to be exhaustive or to limit the invention to the precise forms disclosed. One skilled in the relevant art will recognize that the invention can be practiced without one or more of the specific details, or with other methods, components, etc.

In other instances, well-known structures or operations are not shown or described in detail to avoid obscuring aspects of the invention. While specific embodiments of, and examples for, the invention are described herein for illustrative purposes, various equivalent modifications are possible within the scope of the invention, as those skilled in the relevant art will recognize. These modifications may be made to the invention in light of the above detailed description.

What is claimed is:

1. A method for storing chunks of data objects in a distributed object storage system, the method comprising:
    encoding forward-references from version manifests to the chunks in a manifest tracking subsystem which stores the version manifests; and
    encoding stream sessions backreferences into metadata associated with the chunks, wherein the stream session backreferences each identifies a stream session having a finite retention epoch, and wherein each stream session identifies a set of one or more objects being edited and a source providing edits during the retention epoch;
    requesting by the source a put of a version manifest to the system during the retention epoch;
    reading chunk references that are contained, directly or indirectly, in the version manifest;
    using the chunk references to determine inherited chunks, wherein the inherited chunks are chunks from a reference version manifest that is identified by the stream session; and
    performing a touch operation to add stream session backreferences to the inherited chunks.

2. A method for storing chunks of data objects in a distributed object storage system, the method comprising:
    encoding forward-references from version manifests to the chunks in a manifest tracking subsystem which stores the version manifests; and encoding stream sessions backreferences into metadata associated with the chunks, wherein the stream session backreferences each identifies a stream session having a finite retention epoch, and wherein each stream session identifies a set of one or more objects being edited and a source providing edits during the retention epoch;

requesting by the source a put of a version manifest to the system during the retention epoch;

reading chunk references that are contained, directly or indirectly, in the version manifest;

using the chunk references to determine inherited chunks, wherein the inherited chunks are chunks from a reference version manifest that is identified by the stream session; and using the chunk references to determine put-during-session chunks, wherein the put-during-session chunks are chunks that were put previously during the retention epoch.

3. The method of claim 2 further comprising:

unputting transitory chunks, which are put-during-session chunks that are not in a most recent version manifest.

4. The method of claim 3 further comprising:

releasing cache resources when the transitory chunks are unput.

5. The method of claim 2 further comprising:

using the chunk references to determine new chunks, wherein the new chunks were not put previously during the retention epoch and are not inherited chunks.

6. The method of claim 5 further comprising:

putting the new chunks to the system, each new chunk being put with a stream session backreference.

7. A system for storing chunks of data objects, the system comprising:

one or more servers encoding forward-references from version manifests to the chunks in a manifest tracking subsystem which stores the version manifests; and one or more servers encoding stream sessions backreferences into metadata associated with the chunks, wherein the stream session backreferences each identifies a stream session having a finite retention epoch, and wherein each stream session identifies a set of one or more objects being edited and a source providing edits during the retention epoch, wherein the source requests a put of a version manifest to the system during the retention epoch, chunk references that are contained, directly or indirectly, in the version manifest are read, and the chunk references are used to determine inherited chunks, the inherited chunks being chunks from a reference version manifest that is identified by the stream session, and wherein a touch operation is performed to add stream session backreferences to the inherited chunks.

8. A distributed storage system for storing chunks of data objects, the system comprising:

one or more servers encoding forward-references from version manifests to the chunks in a manifest tracking subsystem which stores the version manifests; and one or more servers encoding stream sessions backreferences into metadata associated with the chunks, wherein the stream session backreferences each identifies a stream session having a finite retention epoch, and wherein each stream session identifies a set of one or more objects being edited and a source providing edits during the retention epoch, wherein the source requests a put of a version manifest to the system during the retention epoch, chunk references that are contained, directly or indirectly, in the version manifest are read, and the chunk references are used to determine inherited chunks, the inherited chunks being chunks from a reference version manifest that is identified by the stream session, and wherein the chunk references are used to determine put-during-session chunks, and the put-during-session chunks are chunks that were put previously during the retention epoch.

9. The system of claim 8, wherein transitory chunks are unput, wherein the transitory chunks are put-during-session chunks that are not in a most recent version manifest.

10. The system of claim 9, wherein cache resources are released when the transitory chunks are unput.

11. The system of claim 8, wherein the chunk references are used to determine new chunks, and wherein the new chunks were not put previously during the retention epoch and are not inherited chunks.

12. The system of claim 11, wherein the new chunks are put to the system, each new chunk being put with a stream session backreference.

\* \* \* \* \*